US009054608B2

United States Patent
Sugie et al.

(10) Patent No.: US 9,054,608 B2
(45) Date of Patent: Jun. 9, 2015

(54) ELECTRIC MOTOR CONTROL SYSTEM AND COMMUNICATION METHOD

(75) Inventors: Hiroshi Sugie, Chiyoda-ku (JP);
Masahiro Ougiwari, Chiyoda-ku (JP);
Daisuke Koyama, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 174 days.

(21) Appl. No.: 13/978,753

(22) PCT Filed: Feb. 21, 2011

(86) PCT No.: PCT/JP2011/053702
§ 371 (c)(1),
(2), (4) Date: Jul. 9, 2013

(87) PCT Pub. No.: WO2012/114435
PCT Pub. Date: Aug. 30, 2012

(65) Prior Publication Data
US 2013/0285589 A1    Oct. 31, 2013

(51) Int. Cl.
*H02P 5/00* (2006.01)
*G05B 19/4155* (2006.01)

(52) U.S. Cl.
CPC .............. *H02P 5/00* (2013.01); *G05B 19/4155* (2013.01); *G05B 2219/36245* (2013.01)

(58) Field of Classification Search
CPC ........................................................ H02P 5/00
USPC ............................................ 318/600, 560, 34
See application file for complete search history.

(56) References Cited

U.S. PATENT DOCUMENTS 5,355,062 A * 10/1994 Takizawa et al. .......... 318/568.1
5,990,638 A * 11/1999 Aoyama et al. ................. 318/85
(Continued)

FOREIGN PATENT DOCUMENTS

GB          2373618 A       9/2002
JP          4-215108 A      8/1992
(Continued)

OTHER PUBLICATIONS

Taiwanese Office Action, mailed Oct. 30, 2013, Application No. 100130242.
(Continued)

*Primary Examiner* — David S Luo
(74) *Attorney, Agent, or Firm* — Sughrue Mion, PLLC; Richard C. Turner

(57) ABSTRACT

An upper-level control device includes a communication control unit that transmits a command, which is used after a command that is currently executed and includes an execution order, to an electric motor control device during electric motor control devices respectively perform driving controls of electric motors, and each of the electric motor control devices includes a command storage unit configured to store a plurality of commands, a communication control unit that stores the command received from the upper-level control device in the command storage unit in the execution order, and a command-follow-up control unit that performs a follow-up control of the electric motors based on the command. When the command storage unit is fully filled with the commands, the communication control unit stores a newly received command in the command storage unit by overwriting the newly received command in an area where an executed command is stored.

6 Claims, 11 Drawing Sheets

(56) References Cited

U.S. PATENT DOCUMENTS

| | | |
|---|---|---|
| 6,130,515 A | 10/2000 | Nishimura |
| 6,791,294 B1 | 9/2004 | Kazama et al. |
| 6,792,330 B1 | 9/2004 | Matsumoto et al. |

FOREIGN PATENT DOCUMENTS

| | | |
|---|---|---|
| JP | 5-324022 A | 12/1993 |
| JP | 6-56801 U | 8/1994 |
| JP | 7-75357 A | 3/1995 |
| JP | 9-73310 A | 3/1997 |
| JP | 9-285983 A | 11/1997 |
| JP | 2000-99155 A | 4/2000 |
| JP | 2000-112513 A | 4/2000 |
| JP | 2000-181525 A | 6/2000 |
| JP | 2001-242923 A | 9/2001 |
| JP | 2006-277556 A | 10/2006 |
| WO | 01/02918 A1 | 1/2001 |
| WO | 01/35522 A1 | 5/2001 |

OTHER PUBLICATIONS

Communication dated Jan. 29, 2015 from the State Intellectual Property Office of the People's Republic of China in counterpart Application No. 201180067586.8.

\* cited by examiner

FIG.3

| IDENTIFICATION NUMBER | MOVEMENT DISTANCE | SPEED | ACCELERATION TIME | DECELERATION TIME | STOP TIME | CONTINUATION INFORMATION |
|---|---|---|---|---|---|---|
| 1 | 100 | 2000 | 100 | 100 | 0 | 1 |
| 2 | 1000 | 2000 | 100 | 100 | 0 | 1 |
| 3 | 1500 | 2000 | 100 | 100 | 0 | 0 |
| 4 | 2500 | 2000 | 100 | 100 | 0 | 1 |
| 5 | 3500 | 2000 | 120 | 100 | 0 | 1 |
| 6 | 4500 | 2000 | 100 | 100 | 0 | 0 |
| ... | ... | ... | ... | ... | ... | ... |
| 101 | 54000 | 2000 | 100 | 100 | 0 | 1 |
| 102 | 55000 | 2000 | 100 | 100 | 0 | 1 |
| 103 | 60000 | 2000 | 100 | 100 | 0 | 1 |
| ... | ... | ... | ... | ... | ... | ... |
| 255 | 101000 | 2000 | 100 | 100 | 0 | 0 |

UPDATING ⇒ (at row 2)
EXECUTING ⇒ (at row 102)
RETURN TO 1 AFTER 255

| | No.1 | No.2 | No.3 |
|---|---|---|---|
| IDENTIFICATION NUMBER | No.1 | No.2 | No.3 |
| MOVEMENT DISTANCE | $LX1=X1-X0$ | $LX2=X2-X1$ | $LX3=X0-X2$ |
| SPEED | $VX1=V1*(X1-X0)/\{(X1-X0)^2+(Y1-Y0)^2\}^{1/2}$ | $VX2=V2*(X2-X1)/\{(X2-X1)^2+(Y2-Y1)^2\}^{1/2}$ | $VX3=V3*(X0-X2)/\{(X0-X2)^2+(Y0-Y2)^2\}^{1/2}$ |
| ACCELERATION TIME | Ta1 | Ta2 | Ta3 |
| DECELERATION TIME | Ta1 | Ta2 | Ta3 |
| STOP TIME | 0 | 0 | 0 |
| CONTINUATION INFORMATION | CONTINUE | CONTINUE | COMPLETE |

(b)

| | No.1 | No.2 | No.3 |
|---|---|---|---|
| IDENTIFICATION NUMBER | No.1 | No.2 | No.3 |
| MOVEMENT DISTANCE | $LY1=Y1-Y0$ | $LY2=Y2-Y1$ | $LY3=Y0-Y2$ |
| SPEED | $VY1=V1*(Y1-Y0)/\{(X1-X0)^2+(Y1-Y0)^2\}^{1/2}$ | $VY2=V2*(Y2-Y1)/\{(X2-X1)^2+(Y2-Y1)^2\}^{1/2}$ | $VY3=V3*(Y0-Y2)/\{(X0-X2)^2+(Y0-Y2)^2\}^{1/2}$ |
| ACCELERATION TIME | Ta1 | Ta2 | Ta3 |
| DECELERATION TIME | Ta1 | Ta2 | Ta3 |
| STOP TIME | 0 | 0 | 0 |
| CONTINUATION INFORMATION | CONTINUE | CONTINUE | COMPLETE |

SEQUENTIAL COMMAND
(a) COMMAND NUMBER, POSITION COMMAND
(b) COMMAND NUMBER, POSITION COMMAND
(c) COMMAND NUMBER, POSITION COMMAND

10A UPPER-LEVEL CONTROL DEVICE → 30A ELECTRIC MOTOR CONTROL DEVICE

SEQUENTIAL COMMAND TABLE

| COMMAND NUMBER | POSITION COMMAND |
|---|---|
| 0 | 9999999 |
| 1 | 9999999 |
| 2 | 9999999 |
| 3 | 9999999 |
| 4 | 9999999 |
| 5 | 70 |
| 6 | 90 |
| 7 | 100 |
| 8 | 110 |
| 9 | 9999999 |

EXECUTING ⇒ (row 5)
UPDATING ⇒ (row 8)
RETURN TO 0 AFTER 9

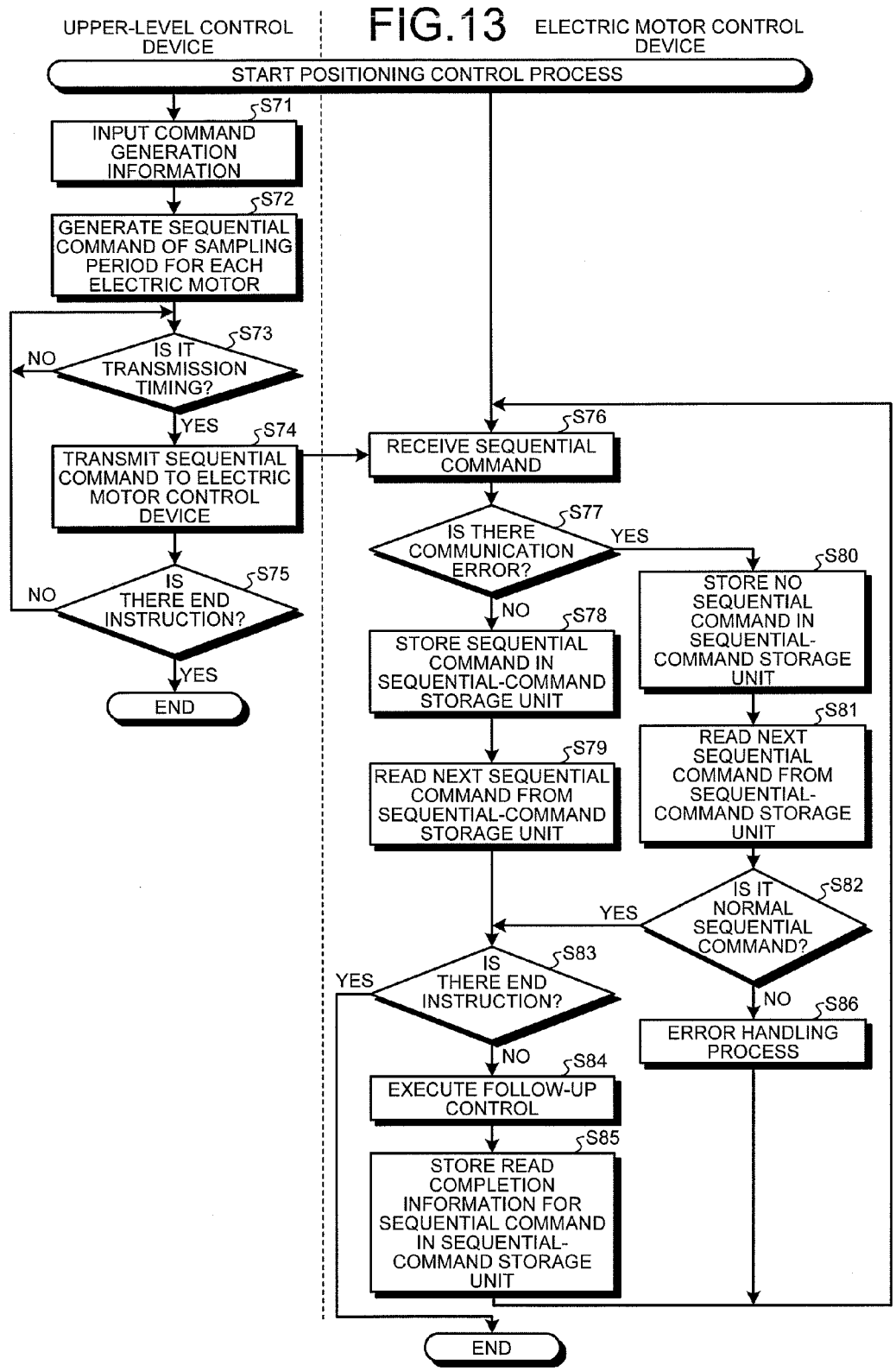

ELECTRIC MOTOR CONTROL SYSTEM AND COMMUNICATION METHOD

CROSS REFERENCE TO RELATED APPLICATIONS

This application is a National Stage of International Application No. PCT/JP2011/053702, filed on Feb. 21, 2011, the contents of all of which are incorporated herein by reference in their entirety.

FIELD

The present invention relates to an electric motor control system and a communication method.

BACKGROUND

In a conventional electric motor control system, a plurality of electric motor control devices respectively provided for a plurality of electric motors and an upper-level control device that controls the electric motor control devices are connected to each other via a network. As a command communication system between the upper-level control device and the electric motor control device in such an electric motor control device, a technique has been known in which a positioning command is transmitted from the upper-level control device to the electric motor control device at the first step, a start command is transmitted from the upper-level control device to the electric motor control device at the second step, and upon receiving the start command, the electric motor control device drives the electric motor (see, for example, Patent Literature 1).

As another command communication system between the upper-level control device and the electric motor control device, for example, a technique has been known in which a sequential command is transmitted from the upper-level control device to the electric motor control device for each control cycle to drive the electric motor (see, for example, Patent Literature 2).

CITATION LIST

Patent Literatures

Patent Literature 1: Japanese Patent Application Laid-open No. 2001-242923
Patent Literature 2: Japanese Patent Application Laid-open No. H9-73310

SUMMARY

Technical Problem

However, in the command communication system described in Patent Literature 1, an operation of a positioning command transmitted by a single communication can be only performed with a single start command, causing a problem that an operation of a successive long sequence of positioning commands cannot be performed. Furthermore, when command communication is failed due to noise or the like, the command should be re-transmitted, causing a problem that a start of the electric motor is delayed by a time for which the command is re-transmitted.

Furthermore, in the command communication system described in Patent Literature 2, when the command communication is failed due to noise or the like, it is the only alternative for the electric motor control device to execute a control based on an old command received last, causing a problem that an error is generated.

The present invention has been achieved in view of the above problems, and an object of the present invention is to provide an electric motor control system and a communication method that perform an operation of a successive long sequence of positioning commands even when command communication is failed due to noise or the like.

Solution to Problem

In order to attain the above object, an electric motor control system of the present invention includes an electric motor control device that controls an electric motor, and an upper-level control device that controls the electric motor control device, in which the electric motor control device and the upper-level control device are connected to each other via a network, the upper-level control device is configured to transmit a command for driving the electric motor to the electric motor control device, and the electric motor control device is configured to control the electric motor based on the command, to drive a driving target object to a target position by the electric motor. The upper-level control device includes a communication control unit that transmits a command, which is used after a command that is currently executed and includes an execution order, to the electric motor control device during the electric motor control device performs a driving control of the electric motor. The electric motor control device includes a command storage unit configured to store a plurality of commands, a communication control unit that stores the command received from the upper-level control device in the command storage unit in the execution order, and a command-follow-up control unit that performs a follow-up control of the electric motor based on the command. When the command storage unit is fully filled with the commands, the communication control unit of the electric motor control device stores a newly received command in the command storage unit by overwriting the newly received command in an area where an executed command is stored.

Advantageous Effects of Invention

According to the present invention, an upper-level control device is configured to transmit a positioning command preceding to a positioning command to be used in the next control to an electric motor control device during an operation of an electric motor, and thus a successive long sequence of positioning commands can be executed without affecting a command operation that is currently performed even when command communication is failed due to noise or the like and re-transmission of the command is performed.

BRIEF DESCRIPTION OF DRAWINGS

FIG. 3 is an example of a point table.

FIG. 8 are examples of a positioning command.

FIG. 13 is a flowchart of an example of a procedure of a positioning process of an electric motor control system according to a second embodiment.

DESCRIPTION OF EMBODIMENTS

Exemplary embodiments of an electric motor control system and a communication method according to the present invention will be explained below in detail with reference to the accompanying drawings. The present invention is not limited to the embodiments.

First Embodiment

Figure 1:
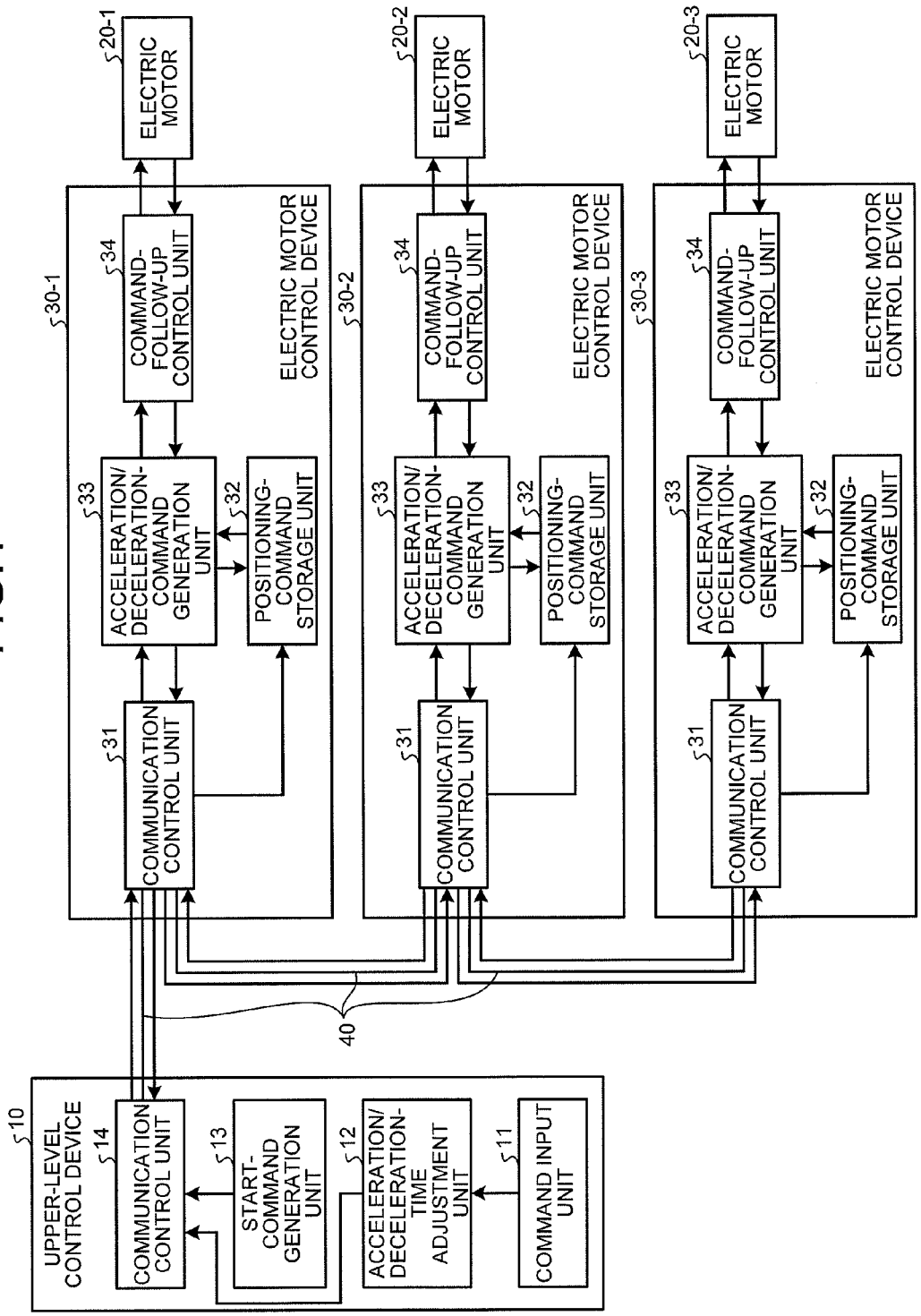
FIG. 1 is a block diagram schematically depicting an example of a configuration of an electric motor control system according to a first embodiment.

FIG. 1 is a block diagram schematically depicting an example of a configuration of an electric motor control system according to a first embodiment of the present invention. In the electric motor control system, an upper-level control device 10 that generates a positioning command, which is source data for controlling an electric motor 20, the electric motor 20, which is a controlling target object, and an electric motor control device 30 that stores the positioning command from the upper-level control device 10 and performs a positioning control of the electric motor 20 based on a start command transmitted from the upper-level control device 10 separately from the positioning command are connected to each other via a network 40.

In this example, three electric motor control devices 30-1 to 30-3 are connected to the upper-level control device 10, and electric motors 20-1 to 20-3 are respectively connected to the electric motor control devices 30-1 to 30-3. Each of the electric motors 20-1 to 20-3 includes, for example, a servomotor as a controlling target device and an encoder that detects the position and speed of the servomotor. A plurality of servomotors are used in an apparatus (a driving target object) that requires a multi-axes control, such as a robot or a machine tool, and the servomotors are controlled to operate in synchronization with each other.

The upper-level control device 10 includes a command input unit 11, an acceleration/deceleration-time adjustment unit 12, a start-command generation unit 13, and a communication control unit 14. The command input unit 11 inputs command generation information including position information that indicates a position where the driving target object (a reference location thereof) exists at a certain time, speed information that indicates a speed in a process of arriving at the position, and the like. For example, the command generation information is input by an operator of the electric motor control system.

The acceleration/deceleration-time adjustment unit 12 generates a positioning command for each of the electric motors 20-1 to 20-3 based on the input position information and the input speed information. In this case, the positioning command in which an acceleration is adjusted in such a manner that acceleration times and/or deceleration times (hereinafter, "acceleration/deceleration times") of the plurality of electric motors 20-1 to 20-3 to be synchronized match each other is generated for each of the electric motors 20-1 to 20-3.

Figure 2:
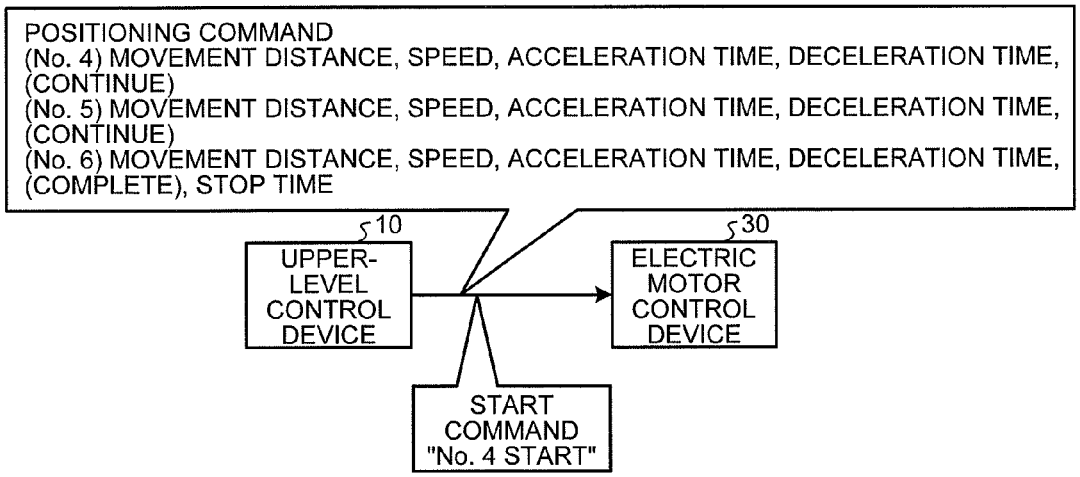
FIG. 2 is an example of a command transmitted from an upper-level control device to an electric motor control device.

FIG. 2 is an example of a command transmitted from an upper-level control device to an electric motor control device. The positioning command includes, for example, an identification number for identifying the positioning command, a movement distance to a target position of a driving target object in a certain section, a speed of the driving target object in the section, an acceleration time when accelerating in the section, a deceleration time when decelerating in the section, continuation information for determining whether to execute the next positioning command continuously (continue/complete), and a stop time that is a wait time when not continued. However, this is merely an example, so that a coordinate position set for the driving target object can be used instead of the movement distance, and the acceleration can be used instead of the acceleration time and the deceleration time. Furthermore, when the next positioning command is continuously executed, a negative value can be set to the wait time without using the continuation information. Further, the movement distance or the coordinate position is target position information, and the acceleration time, the deceleration time, or the acceleration is acceleration/deceleration information. The positioning command is generated for each of the electric motor control devices 30-1 to 30-3 connected to the upper-level control device 10.

The start-command generation unit 13 transmits a start command for instructing execution of the positioning command to the electric motor control devices 30-1 to 30-3 to which the positioning command is transmitted. As shown in FIG. 2, the start command includes, for example, an identification number for identifying the positioning command.

The communication control unit 14 controls transmission and reception of data performed with the electric motor control devices 30-1 to 30-3 within the network 40. For example, the communication control unit 14 transmits the positioning command generated by the acceleration/deceleration-time adjustment unit 12 to each of the electric motor control devices 30-1 to 30-3, and transmits the start command generated by the start-command generation unit 13 to each of the electric motor control devices 30-1 to 30-3 after transmitting the positioning command. The communication control unit 14 transmits the positioning command to the electric motors 20-1 to 20-3 in advance. However, the transmission timing is optional, so that, for example, the communication control unit 14 may transmit a plurality of positioning commands generated by the acceleration/deceleration-time adjustment unit 12 in advance before the electric motors 20-1 to 20-3 are driven or may transmit a positioning command that precedes a positioning command that is currently executed during an operation of the electric motor control devices 30-1 to 30-3.

Each of the electric motor control devices 30-1 to 30-3 includes a communication control unit 31, a positioning-command storage unit 32, an acceleration/deceleration-command generation unit 33, and a command-follow-up control unit 34. The communication control unit 31 performs transmission and reception of data with the upper-level control device 10 and the other electric motor control device 30 connected to the network 40.

The positioning-command storage unit 32 stores the positioning command received from the upper-level control device 10. The positioning-command storage unit 32 has a capacity large enough to store a plurality of positioning commands not only one positioning command. For example, the positioning-command storage unit 32 stores a point table in which a plurality of positioning commands are sequentially arranged. FIG. 3 is an example of the point table. In this example, the point table is configured to store 255 positioning commands. The point table includes fields of the identification number of each positioning command, the movement distance, the speed, the acceleration time, the deceleration time, the stop time, and the continuation information. In FIG. 3, "1" of the continuation information indicates "continue" and "0" indicates "not continue". In this point table, the positioning commands are stored in order from the top of the table, and when the last line of the table is reached, the storing order returns to the top again so that the positioning commands are stored to overwrite the old data. Furthermore, in this point table, a positioning command is stored in advance before an operation process of the electric motor control devices 30-1 to 30-3 or a positioning that is performed subsequent to a positioning command that is currently executed when the operation process of the electric motor control devices 30-1 to 30-3 is performed. FIG. 3 depicts a case where a positioning command of the identification number No. 2 is updated during execution of a positioning command of the identification number No. 102.

The acceleration/deceleration-command generation unit 33 generates a position command, which is a sequential command for each control cycle (a sampling period), from the movement distance, the speed, and the acceleration/deceleration time included in the positioning command in the positioning-command storage unit 32 specified by the start command from the upper-level control device 10, and outputs the position command to the command-follow-up control unit 34. The position command is information indicated by a movement amount or a coordinate position in a sequential-command control section that is obtained by further dividing a section defined by the positioning command. When a positioning command in the point table is completed, the acceleration/deceleration-command generation unit 33 refers to the continuation information in the corresponding positioning command in the positioning-command storage unit 32 to check if the continuation information is set to "continue". When the continuation information is set to "continue", the acceleration/deceleration-command generation unit 33 continuously generates a position command for each control cycle for the next positioning command in the point table. When the continuation is not set to "continue", the acceleration/deceleration-command generation unit 33 stops the process with the positioning command that is currently executed, and outputs an instruction to the electric motors 20-1 to 20-3 to wait for a time that is specified by the wait time.

The command-follow-up control unit 34 executes a feed forward control and a feedback control based on the position command generated by the acceleration/deceleration-command generation unit 33 to control the electric motors 20-1 to 20-3.

Figure 4:
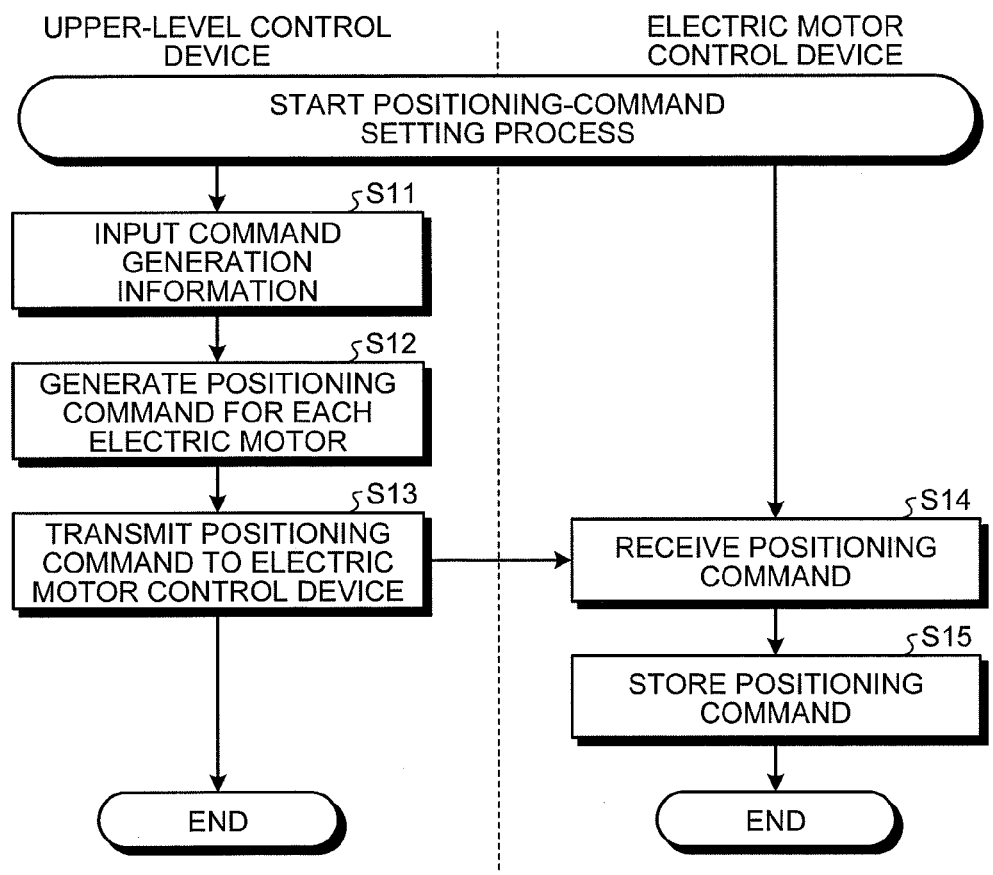
FIG. 4 is a flowchart of an example of a procedure of a positioning-command setting process of the electric motor control system according to the first embodiment.

A positioning-command setting process and a positioning-command executing process in the electric motor control system are explained next. FIG. 4 is a flowchart of an example of a procedure of the positioning-command setting process of the electric motor control system according to the first embodiment. First, when the command generation information including the position information and the speed information is input to the upper-level control device 10 via the command input unit 11 (Step S11), the acceleration/deceleration-time adjustment unit 12 generates the positioning command, in which the acceleration is adjusted in such a manner that the acceleration/deceleration times of the plurality of electric motors 20-1 to 20-3 to be synchronized match each other, for each of the electric motors 20-1 to 20-3 (Step S12). The acceleration/deceleration-time adjustment unit 12 then transmits the positioning command to the electric motor control devices 30-1 to 30-3 (Step S13). When the positioning command is received (Step S14), each of the electric motor control devices 30-1 to 30-3 sequentially stores received positioning commands in the positioning-command storage unit 32 (Step S15). With these operations, the positioning-command setting process is completed.

Figure 5:
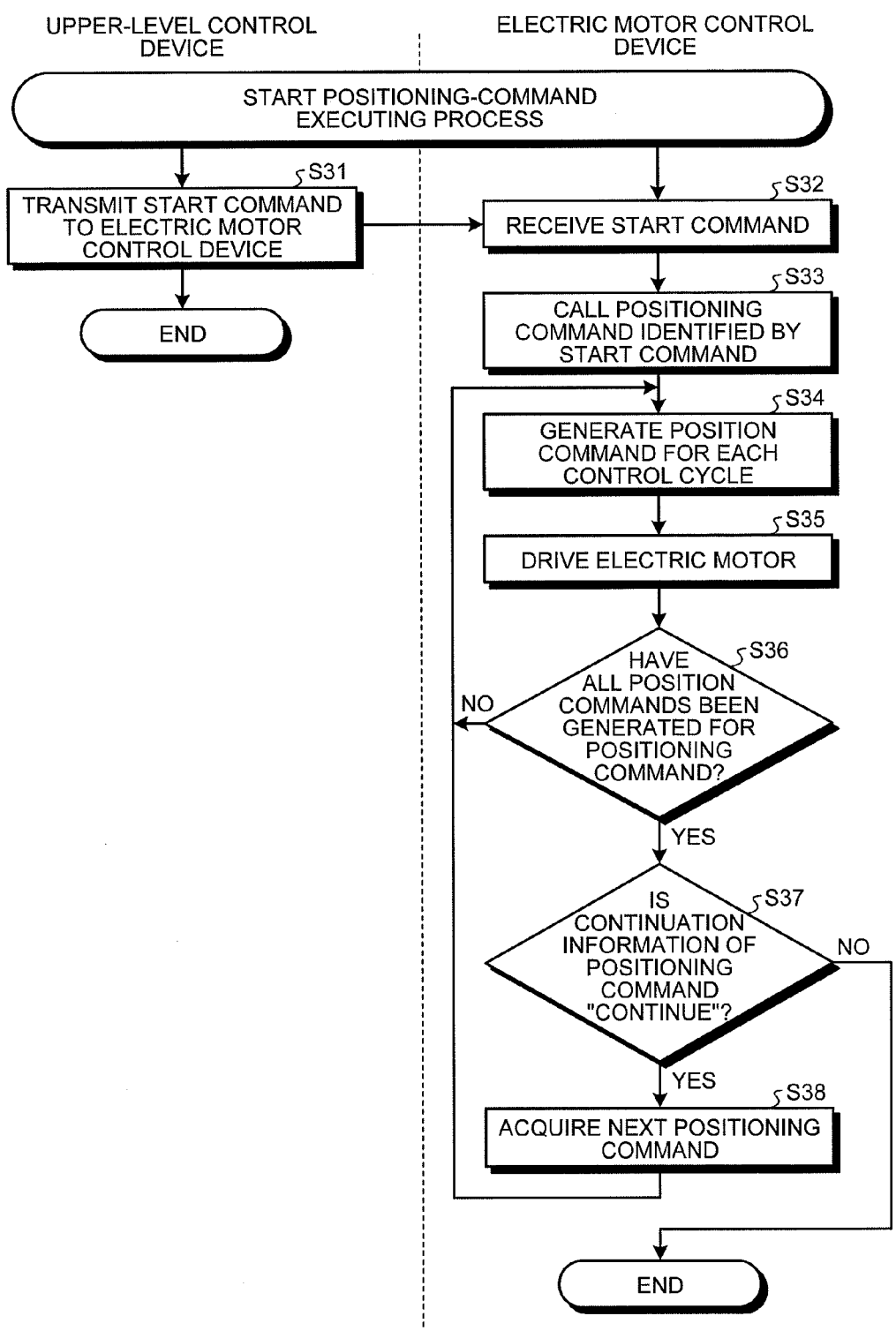
FIG. 5 is a flowchart of an example of a procedure of a positioning-command executing process of the electric motor control system according to the first embodiment.

FIG. 5 is a flowchart of an example of a procedure of the positioning-command executing process of the electric motor control system according to the first embodiment. First, the start-command generation unit 13 of the upper-level control device 10 transmits the start command to the electric motor control devices 30-1 to 30-3 (Step S31). The start command includes information such as the identification number for identifying the positioning command with which the process is performed and the like. The start command is transmitted to all the electric motor control devices 30-1 to 30-3.

When the start command is received (Step S32), each of the electric motor control devices 30-1 to 30-3 calls the positioning command corresponding to the identification number included in the start command (Step S33), and the positioning command is sent to the acceleration/deceleration-command generation unit 33. The acceleration/deceleration-command generation unit 33 generates the position command for each control cycle based on the positioning command (Step S34) and outputs the position command to the electric motors 20-1 to 20-3 to drive the electric motors 20-1 to 20-3 (Step S35).

Thereafter, the acceleration/deceleration-command generation unit 33 determines whether all position commands are generated for a positioning command in the positioning-command storage unit 32 (Step S36). This can be determined by, for example, dividing a section defined by the positioning command into sequential-command control sections to be processed in a control cycle and determining whether the position command is generated for all the sequential-command control sections. When it is determined that not all the position commands are generated (NO at Step S36), the process control returns to Step S34. On the other hand, when it is determined that all the position commands are generated (YES at Step S36), the acceleration/deceleration-command generation unit 33 determines whether the continuation information of the positioning command that is currently processed is "continue" (Step S37).

When it is determined that the continuation information is "continue" (YES at Step S37), the acceleration/deceleration-command generation unit 33 acquires the positioning command stored in the next point table of the positioning command that is currently processed (Step S38) and returns to Step S34 to generate the position command for the next positioning command. With this operation, the next positioning command can be executed without the start command for the next positioning command from the upper-level control device 10. On the other hand, when it is determined that the continuation information is not "continue" (NO at Step S37), the acceleration/deceleration-command generation unit 33 acquires the stop time of the positioning command that is currently processed, and the positioning-command executing process is completed after the stop time is elapsed.

The positioning-command setting process shown in FIG. 4 can be performed in advance before the positioning-command executing process shown in FIG. 5 or during the positioning-command executing process shown in FIG. 5 (a control process by the electric motor control devices 30-1 to 30-3).

Figure 6:
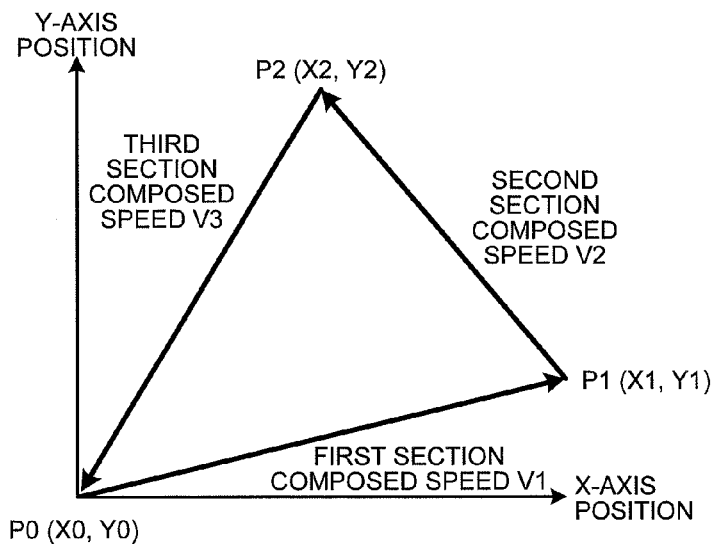
FIG. 6 is an example of a command position of a driving target object.

The positioning-command setting process and the positioning-command executing process are explained below with examples. FIG. 6 is an example of a command position of a driving target object. In FIG. 6, three successive linear interpolations between two axes including an X-axis and a Y-axis are shown as an example. That is, this example represents a case where the driving target object is driven along three successive straight lines while synchronizing the electric motor 20-1 that moves the driving target object in the X-axis direction with the electric motor 20-2 that moves the driving target object in the Y-axis direction that is perpendicular to the X-axis direction.

In FIG. 6, it is assumed that the driving target object is moved to plot a trajectory starting from a point P0 (X0, Y0) and linearly moving to a point P1 (X1, Y1), a point P2 (X2, Y2), and the point P0. A section between the point P0 and the point P1 is defined as a first section, a section between the point 1 and the point 2 is defined as a second section, a section between the point 2 and the point 0 is defined as a third section, and speeds (composed speeds) of the sections are respectively defined as V1, V2, and V3.

The acceleration/deceleration-time adjustment unit 12 of the upper-level control device 10 generates the positioning command from the command generation information including the position information and the speed information as shown in FIG. 6. For example, in the first section shown in FIG. 6, the acceleration/deceleration is adjusted in such a manner that a time for which the driving target object is moved in the X-axis direction by a movement distance LX (=X1−X0) and a time for which the driving target object is moved in the Y-axis direction by a movement distance LY (=Y1−Y0) are equal to each other and the acceleration/deceleration times of the electric motors 20-1 and 20-2 to be synchronized match each other. The acceleration/deceleration is adjusted in the same manner in the second section and the third section.

Figure 7:
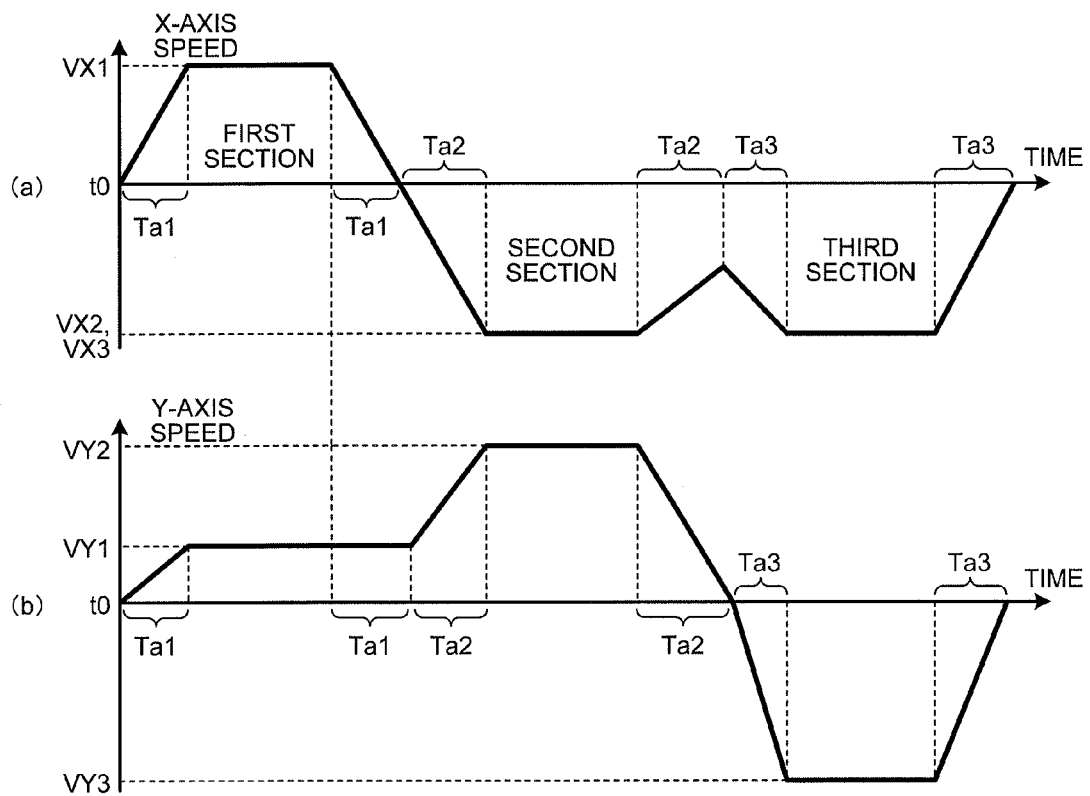
FIG. 7 are examples of a relationship between a speed and a time with acceleration/deceleration times adjusted in each of sections shown in FIG. 6.

FIG. 7 are examples of a relationship between a speed and a time with acceleration/deceleration times adjusted in each of the sections shown in FIG. 6, where FIG. 7(a) indicates the speed in the X-axis direction, and FIG. 7(b) indicates the speed in the Y-axis direction. In the drawings, the horizontal axis represents the time and the vertical axis represents the speed. As shown in FIG. 7, an adjustment is made in such a manner that the acceleration/deceleration times match each other in the X-axis direction and the Y-axis direction. That is, the acceleration/deceleration time is Ta1 in the first section, Ta2 in the second section, and Ta3 in the third section.

The acceleration/deceleration-time adjustment unit 12 of the upper-level control device 10 generates the relationship between the speed and the time in each of the sections shown in FIG. 7 as the positioning command. FIG. 8 are examples of a positioning command, where FIG. 8(a) indicates the positioning command in the X-axis direction, and FIG. 8(b) indicates the positioning command in the Y-axis direction. In FIG. 8, the identification numbers No. 1, 2, and 3 correspond to the positioning command in the first section, the second section, and the third section, respectively. Furthermore, because a case where the first to third sections are continuously processed is shown as an example, the continuation information is "continued" in the identification numbers No. 1 and 2 and the continuation information is "completed" in the identification number No. 3. The positioning command generated in this manner is transmitted to a corresponding one of the electric motor control devices 30-1 to 30-2.

Each of the electric motor control devices 30-1 and 30-2 stores the positioning commands No. 1, No. 2, and No. 3 received from the upper-level control device 10 in the positioning-command storage unit 32. Thereafter, a start command including the identification number No. 1 of the positioning command to be executed is transmitted from the upper-level control device 10 to each of the electric motor control devices 30-1 and 30-2. The acceleration/deceleration-command generation unit 33 of each of the electric motor control devices 30-1 and 30-2 calculates the movement distance for each sampling period ΔT with the following procedure from the positioning command that matches the identification number included in the start command. In the following descriptions, the movement distance for each sampling period ΔT in the X-axis direction in the first section is explained.

First, the number of samplings n1 required for the movement is calculated by using Equation (1).

$$n1=\text{ceil}\{LX1/(VX1\times \Delta T)\} \quad (1)$$

This defines a movement distance FΔT_X1 for each sampling period as Equation (2).

$$F\Delta T\_X1=LX1/n1 \quad (2)$$

For example, the acceleration/deceleration is adjusted by using a moving average filter. In this case, the number of stages NA1 of the moving average filter is defined as Equation (3).

$$NA1=\text{ceil}(Ta1/\Delta T) \quad (3)$$

By using the moving average filter having the number of stages NA1 as obtained in the above manner, the movement distance FAT_X (a sequential command) of each sampling period with the acceleration/deceleration adjusted is obtained. The movement distance FAT_X obtained in the above manner is then transmitted from the acceleration/deceleration-command generation unit 33 to the command-follow-up control unit 34, and the command-follow-up control unit 34 executes a feed forward control and a feedback control to drive the electric motors 20-1 and 20-2, by which the driving target object is driven according to the position command.

Figure 9:
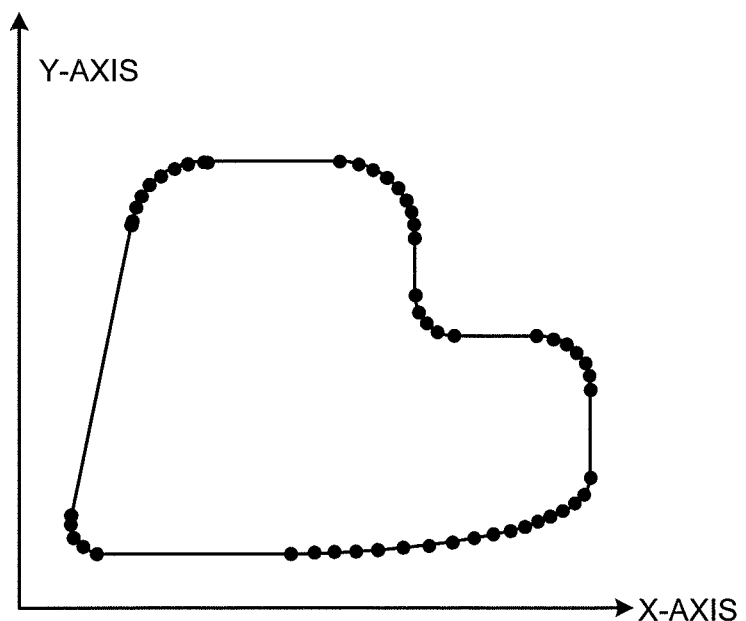
FIG. 9 is an example of a command position of a driving target object.

In the example described above, the three successive linear interpolations between the two axes including the X-axis and the Y-axis shown in FIG. 6 are used as the example. However, successive trajectory commands of a complicated shape can be executed without being affected by a limit of the number of positioning commands stored in the point table, by transmitting a positioning command preceding the positioning command that is currently executed during the operation of the electric motor 20 from the upper-level control device 10 to the electric motor control device 30 and updating the point table of the positioning-command storage unit 32 with the transmitted positioning command. FIG. 9 is an example of a command position of a driving target object. In FIG. 9, a movement trajectory of the driving target object is defined by a curved line, having a shape more complicated than that shown in FIG. 6. Even in such a case, the driving target object can be driven by performing a quasi-curved-line interpolation control (a simple trajectory control) for approximating the curved line by, for example, successive line segments each connecting between black circles. At this time, one line segment connecting between the black circles corresponds to one positioning command described in the above example, and by generating a plurality of positioning commands along the curved line, the same control as the above can be performed.

In the first embodiment, in the electric motor control system including the upper-level control device 10, the electric motor control device 30, and the electric motor 20 connected via the network 40, the upper-level control device 10 is configured to transmit a positioning command preceding a positioning command to be used in the next control to the electric motor control device 30. With this configuration, even when the command communication is failed due to noise or the like so that re-transmission of the command is performed, it is possible to prevent a trajectory error or a delay from being generated without affecting a command operation that is currently performed.

The upper-level control device 10 is further configured to transmit the continuation information that indicates whether to continuously execute the next positioning command to the electric motor control device 30, and the electric motor control device 30 is configured to store a plurality of positioning commands in the positioning-command storage unit 32. With this configuration, the electric motor control device 30 can execute a plurality of successive positioning commands only with a single start command transmitted from the upper-level control device 10 to the electric motor control device 30.

Furthermore, because a newly received positioning command is configured to be overwritten an executed positioning command area of the positioning-command storage unit 32, even when there is a limit in the storage capacity of the positioning-command storage unit 32 of the electric motor control device 30, it is possible to perform an operation of a successive long sequence of positioning commands.

The upper-level control device 10 is configured to include the acceleration/deceleration-time adjustment unit 12 that generates the positioning command, and the electric motor control device 30 is configured to include the acceleration/deceleration-command generation unit 33 that generates the position command from the positioning command. With this configuration, the upper-level control device 10 does not need to generate a position command for the electric motor 20, and as a result, it is possible to achieve a synchronization control of a plurality of electric motors 20 without increasing a computation load of the upper-level control device 10.

Furthermore, it is possible to transmit the positioning command having a large size by using a time before an operation process that allows a retry, and when transmitting only the start command having a small size before an operation process, prevent a failure due to noise from being generated.

Second Embodiment

Figure 10:
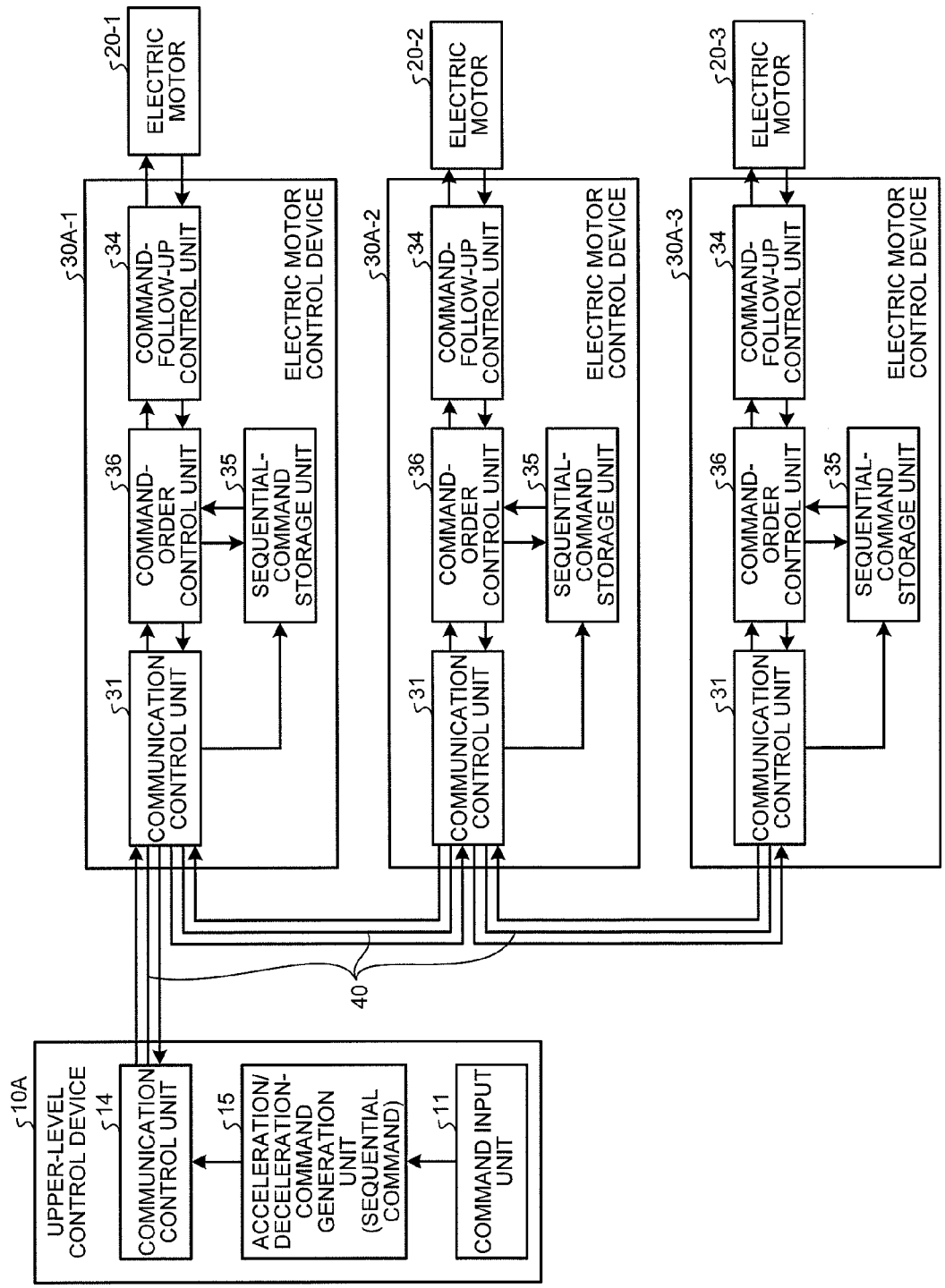
FIG. 10 is a block diagram schematically of an example of a configuration of an electric motor control system according to a second embodiment of the present invention.

FIG. 10 is a block diagram schematically of an example of a configuration of an electric motor control system according to a second embodiment of the present invention. In the electric motor control system, an upper-level control device 10A that generates a sequential command (a position command) for controlling electric motors 20-1 to 20-3, the electric motors 20-1 to 20-3, which are controlling target objects, and electric motor control devices 30A-1 to 30A-3 that respectively perform positioning controls of the electric motors 20-1 to 20-3 based on the sequential command from the upper-level control device 10A are connected via the network 40. In this example, in the same manner as the first embodiment, the three electric motor control devices 30A-1 to 30A-3 are connected to the upper-level control device 10A, and the electric motors 20-1 to 20-3 are respectively connected to the electric motor control devices 30A-1 to 30A-3. Because the electric motors 20-1 to 20-3 are identical to those of the first embodiment, explanations thereof will be omitted.

The upper-level control device 10A includes a command input unit 11, an acceleration/deceleration-command generation unit 15, and the communication control unit 14. The command input unit 11 inputs command generation information including position information that indicates a position where the driving target object (a reference location thereof) exists at a certain time, speed information that indicates a speed in a process of arriving at the position, acceleration/deceleration information such as an acceleration/deceleration time. For example, the position information and the speed information are input by an operator of the electric motor control system.

Figures 11, 12:
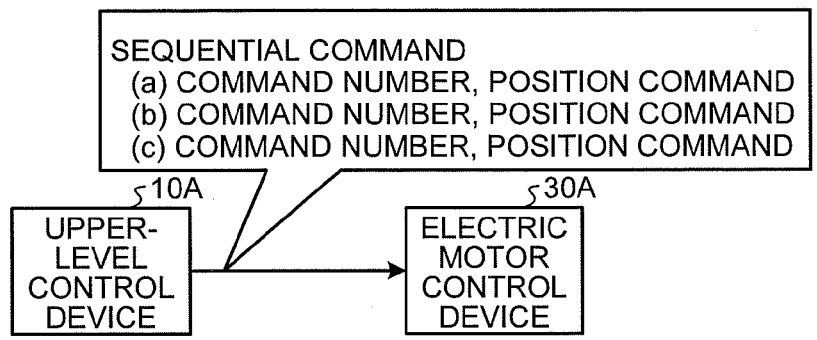
FIG. 11 is an example of a sequential command.
FIG. 12 is an example of a sequential command table.

The acceleration/deceleration-command generation unit 15 generates a sequential command that is a position command in which the acceleration is adjusted for each communication cycle of the network 40 from, for example, the command generation information including the position information, the speed information, and the acceleration/deceleration information input through the command input unit 11. The sequential command is generated for each of the electric motors 20-1 to 20-3. FIG. 11 is an example of the sequential command. The sequential command includes, for example, a command number for identifying the sequential command and a position command indicating a position to which a processing target object is moved in a sampling period (one communication cycle).

The communication control unit 14 transmits the sequential command generated by the acceleration/deceleration-command generation unit 15 in a predetermined communication cycle to the electric motor control devices 30A-1 to 30A-3 via the network 40. The communication control unit 14 further transmits, when transmitting the sequential command, not only the sequential command of the next sampling period but also future sequential commands corresponding to a plurality of sampling periods continued after the next sampling period in a simultaneous manner.

Each of the electric motor control devices 30A-1 to 30A-3 includes the communication control unit 31, a sequential-command storage unit 35, a command-order control unit 36, and the command-follow-up control unit 34. The communication control unit 31 includes a function of performing transmission and reception of data with the upper-level control device 10A and the other of the electric motor control devices 30A-1 to 30A-3 connected to the network 40. In this example, when there is no error generated during a reception of the sequential command from the upper-level control device 10A, the communication control unit 31 is configured to store the received sequential command in the sequential-command storage unit 35 in an order of the command number, and when there is an error generated during the reception of the sequential command, not to store the sequential command in the sequential-command storage unit 35.

The sequential-command storage unit 35 stores the sequential command received from the upper-level control device 10A. The sequential-command storage unit 35 has a capacity large enough to store a plurality of sequential commands not only one sequential command. For example, the sequential-command storage unit 35 stores a sequential command table in which a plurality of sequential commands are sequentially arranged. FIG. 12 is an example of the sequential command table. In this example, the sequential command table is configured to store ten sequential commands. The sequential command table includes fields of a command number and a position command, as well as the sequential command. In this sequential command table, the sequential commands are stored in order from the top of the table, and when the last line of the table is reached, the storing order returns to the top again so that the sequential commands are stored to overwrite the old data. Furthermore, in this sequential command table, sequential commands from the next of the sequential command that is currently executed to after a predetermined communication cycle are stored during a control of the electric motors 20-1 to 20-3.

When the sequential command is received from the upper-level control device 10A, the command-order control unit 36 reads a next sequential command of the sequential command that is currently executed from the sequential-command storage unit 35 (the sequential command table) and outputs the read sequential command to the command-follow-up control unit 34. The command-order control unit 36 stores information indicating that the sequential command has been read in an area where the position command has been stored in the read sequential command table. In the example shown in FIG. 12, "9999999" is stored in the field of "position command" of the read sequential command, to distinguish it from an unread sequential command.

The command-follow-up control unit 34 performs a feed forward control and a feedback control based on the sequential command sent from the command-order control unit 36, to control the electric motors 20-1 to 20-3.

A process procedure for a positioning control in the electric motor control system is explained next. FIG. 13 is a flowchart of an example of a procedure of a positioning process of the electric motor control system according to the second embodiment. First, when the command generation information including the target position, the speed, and the acceleration/deceleration time is input to the upper-level control device 10A via the command input unit 11 (Step S71), the acceleration/deceleration-command generation unit 15 generates the sequential command with the acceleration adjusted for each of the electric motors 20-1 to 20-3 for each communication cycle of the network 40 (Step S72). The sequential command to be generated may include a sequential command to be executed next or sequential commands of a plurality of successive communication cycles (sampling periods). Furthermore, it may be configured such that sequential commands of all communication cycles (sampling periods) are generated in advance based on the input command generation information.

The communication control unit 14 of the upper-level control device 10A then determines whether it is a transmission timing (Step S73), and when it is determined that it is not the transmission timing (NO at Step 73), waits until it becomes the transmission timing. When it becomes the transmission timing (YES at Step S73), the communication control unit 14 of the upper-level control device 10A transmits the generated sequential command to each of the electric motor control devices 30A-1 to 30A-3 (Step S74).

The number of sampling periods for transmitting the sequential command transmitted from the upper-level control device 10A to the electric motor control devices 30A-1 to 30A-3 in advance is increased or decreased according to a noise environment at the time of building the system. For example, the number of preceding sequential commands (hereinafter, "number of preceding commands") after the next sequential command can be determined based on the number of communication errors within a predetermined time. In this case, if the number of communication errors is zero within the predetermined time, the number of preceding commands is unnecessary (zero). That is, only one sequential command (of the next sampling period) is transmitted for each communication cycle. On the other hand, if the number of communication errors is five within the predetermined time, the number of preceding commands is set to five, and the sequential command of the next sampling period and sequential commands for five successive sampling periods thereafter are transmitted for each communication cycle. When a plurality of sequential commands are transmitted, it is assumed that the sequential commands to be transmitted are generated by the acceleration/deceleration-command generation unit 15 by a transmission time.

Thereafter, the communication control unit 14 of the upper-level control device 10A determines whether the transmitted sequential command is an end instruction (Step S75), and when it is determined that the transmitted sequential command is not an end instruction (NO at Step S75), returns to Step S73. On the other hand, when it is determined that the transmitted sequential command is an end instruction (YES at Step S75), the process is ended.

When the sequential command is received from the upper-level control device 10A (Step S76), the communication control unit 31 of each of the electric motor control devices 30A-1 to 30A-3 determines whether there is a communication error generated (Step S77). The generation of the communication error can be detected by setting CRC (Cyclic Redundancy Check) information, check sum information, or the like in a frame for communicating data. When it is determined that there is no communication data generated (NO at Step S77), the communication control unit 31 stores the received sequential command in the sequential-command storage unit 35 (Step S78). Specifically, the communication control unit 31 updates a portion of the corresponding command number in the sequential command table with the received sequential command.

For example, when it is set to transmit three sequential commands in one communication cycle and a follow-up control to a position command (=70) of a command number 5 shown in FIG. 12 is executed, sequential commands of command numbers 6, 7, and 8 are transmitted from the upper-level control device 10A and stored in the sequential command table. Furthermore, when the follow-up control to the position command of the command number 5 is completed and a follow-up control to a position command (=90) of the next command number 6 is executed, sequential commands of command numbers 7, 8, and 9 are transmitted from the upper-level control device 10A and stored in the sequential command table.

Thereafter, the command-order control unit 36 reads a sequential command having the next command number of the position command that is currently executed from the sequential-command storage unit 35 according to a reception of the sequential command (Step S79).

On the other hand, when there is a communication error generated (YES at Step S77), the communication control unit 31 does not store the received sequential command in the sequential-command storage unit 35 (Step S80). Thereafter, the command-order control unit 36 reads a sequential command having the next command number of the position command that is currently executed from the sequential-command storage unit 35 according to a reception of the sequential command (Step S81), and determines whether the read sequential command is a normal sequential command (Step S82).

When it is determined that the read sequential command is a normal sequential command (YES at Step S82) and after Step S79, the command-order control unit 36 determines whether the sequential command is an end instruction (Step S83). When it is determined that the sequential command is not an end instruction (NO at Step S83), the command-order control unit 36 sends the read position command to the command-follow-up control unit 34, and the command-follow-up control unit 34 executes the follow-up control (Step S84), to drive the electric motors 20-1 to 20-3. The command-order control unit 36 then stores information indicating that the read of the sequential command is completed in the sequential-command storage unit 35 (Step S85). In the example shown in FIG. 12, a value "9999999" indicating that the read is completed is stored in the position command for which the read of the sequential command is completed. The process control then returns to Step S76.

On the other hand, when it is determined that the read sequential command is not a normal sequential command (NO at Step S82), for example, when not all the sequential commands are updated due to a successive generation of the communication errors larger than the presumed number, an error handling process is performed (Step S86). For example, when the position command is "9999999" indicating that the read is completed, it is possible to determine that the read sequential command is not a normal sequential command. As the error handling process, it is possible to perform a preset process such as outputting an alarm and stopping the electric motor control system or using the last position command as it is. In this flowchart, the process control is configured to return to Step S76 after the error handling process; however, it can be configured to end the positioning control process instead.

On the other hand, when the sequential command is an end instruction (YES at Step S83), the positioning control process is ended.

In the second embodiment, in the electric motor control system including the upper-level control device 10A, the electric motor control devices 30A-1 to 30A-3, and the electric motors 20-1 to 20-3 connected via the network 40, in the case of a sequential command system in which each of the electric motor control devices 30A-1 to 30A-3 receives the sequential command from the upper-level control device 10A for each control cycle, sequential commands for a predetermined number of cycles are stored in each of the electric motor control devices 30A-1 to 30A-3, and each of the electric motor control devices 30A-1 to 30A-3 is configured to receive a sequential command after the predetermined number of cycles from the upper-level control device 10A during a control operation. With this configuration, it is possible to execute a complicated synchronization control between the plurality of electric motors 20-1 to 20-3, such as a curved line/curved plane interpolation.

Because the sequential commands after the predetermined number of cycles from the sequential command that is currently executed are stored, even when a communication failure is generated due to noise or the like, it is possible to prevent a trajectory error or an operation delay from being generated.

Furthermore, the number of cycles of the sequential command stored in the sequential-command storage unit 35 in each of the electric motor control devices 30A-1 to 30A-3 is configured to be increased or decreased according to a communication status of the network 40. For example, when the environment is noisy so that the communication status is not good, a retry can be made by the number of sequential commands transmitted in advance by increasing the number of cycles of the sequential command to be transmitted for each communication cycle, and as a result, the same effect can be achieved as increasing the number of times allowing retry communication. On the other hand, when the environment is not noisy so that the communication status is good, it is possible to reduce a communication load by decreasing the number of cycles of the sequential command to be transmitted in advance for each communication cycle.

INDUSTRIAL APPLICABILITY

As described above, the electric motor control system according to the present invention is useful as a system in which communication of a command from an upper-level control device to an electric motor control device is performed, thereby controlling an electric motor.

REFERENCE SIGNS LIST 10, 10A upper-level control device
11 command input unit
12 acceleration/deceleration-time adjustment unit
13 start-command generation unit
14, 31 communication control unit
15 acceleration/deceleration-command generation unit
20-1 to 20-3 electric motor
30, 30-1 to 30-3, 30A, 30A-1 to 30A-3 electric motor control device
32 positioning-command storage unit
33 acceleration/deceleration-command generation unit
34 command-follow-up control unit
35 sequential-command storage unit
36 command-order control unit
40 network

The invention claimed is:

1. An electric motor control system comprising: an electric motor control device that controls an electric motor; and an upper-level control device that controls the electric motor control device, wherein
the electric motor control device and the upper-level control device are connected to each other via a network,
the upper-level control device is configured to transmit a command for driving the electric motor to the electric motor control device,
the electric motor control device is configured to control the electric motor based on the command, to drive a driving target object to a target position by the electric motor,
the upper-level control device includes
an acceleration/deceleration-information adjustment unit that generates a positioning command, which includes target position information, speed information, and acceleration/deceleration information and in which the acceleration/deceleration information is adjusted to match between a plurality of the electric motors to be synchronized, for each of the electric motors, and
a communication control unit that transmits a command, which is used after a command that is currently executed and includes an execution order, to the electric motor control device during the electric motor control device performs a driving control of the electric motor, and
the electric motor control device includes
a command storage unit configured to store a plurality of commands,
a communication control unit that stores the command received from the upper-level control device in the command storage unit in the execution order,
an acceleration/deceleration-command generation unit that generates a position command including a movement position of the driving target object within a predetermined sampling period, from the positioning command received from the upper-level control device, and
a command-follow-up control unit that performs a follow-up control of the electric motor based on the command, and wherein
when the command storage unit is fully filled with the commands, the communication control unit of the electric motor control device stores a newly received command in the command storage unit by overwriting the newly received command in an area where an executed command is stored.

2. The electric motor control system according to claim 1, wherein
a plurality of the electric motor control devices are connected to the network, so that data is communicated in a predetermined communication cycle between the upper-level control device and the electric motor control devices,
the communication control unit of the upper-level control device transmits a start command for executing the positioning command, after transmitting the positioning command to the electric motor control devices, and
when the start command is received, the acceleration/deceleration-command generation unit of the electric motor control device acquires the positioning command specified by the start command from the command storage unit and generates the position command.

3. The electric motor control system according to claim 1, wherein
the positioning command further includes continuation information indicating whether to continuously execute a next positioning command of the positioning command, and
when the continuation information indicates continue, the acceleration/deceleration-command generation unit of the electric motor control device continuously executes the next positioning command following the positioning command that is currently executed.

4. The electric motor control system according to claim 3, wherein the communication control unit of the upper-level control device transmits the positioning commands to the electric motor control device in a collective manner.

5. A communication method executed in an electric motor control system that includes an electric motor control device that controls an electric motor and an upper-level control device that controls the electric motor control device connected to each other via a network, wherein
the upper-level control device is configured to transmit a command for driving the electric motor to the electric motor control device, and the electric motor control device is configured to control the electric motor based on the command, to drive a driving target object to a target position by the electric motor, and the communication method comprises:
a positioning-command generating step of the upper-level control device generating a positioning command, which includes target position information, speed information, and acceleration/deceleration information and in which the acceleration/deceleration information is adjusted to match between a plurality of the electric motors to be synchronized, for each of the electric motors;
a command transmitting step of the upper-level control device transmitting a command, which is used after a command that is currently executed and includes an execution order, to the electric motor control device during the electric motor control device performs a driving control of the electric motor;
a start-command transmitting step of the upper-level control device transmitting a start command for executing the positioning command to the electric motor control device, after the command transmitting step;
a command storing step of the electric motor control device storing the command in a command storage unit that is configured to store a plurality of commands;
a position-information generating step of the electric motor control device reading, when the start command is received, the positioning command specified by the start command from the command storage unit and generating a position command including a movement position of the driving target object within a predetermined sampling period; and
a control step of performing a follow-up control of the electric motor based on the command, and wherein
the command storing step includes the electric motor control device storing, when the command storage unit is fully filled with the commands, a newly received command in the command storage unit by overwriting the newly received command in an area where an executed command is stored.

6. The communication method according to claim 5, wherein
the positioning command further includes continuation information indicating whether to continuously execute a next positioning command of the positioning command, and
the position-information generating step includes the electric motor control device executing continuously, when the continuation information indicates continue, the next positioning command following the positioning command that is currently executed.

* * * * *